US010686845B2

(12) United States Patent
Nylander et al.

(10) Patent No.: US 10,686,845 B2
(45) Date of Patent: Jun. 16, 2020

(54) INTERNET CONNECTION LOAD BALANCING WITH DIRECT ACCESS TO BALANCED DEVICES

(71) Applicant: Polycom, Inc., San Jose, CA (US)

(72) Inventors: Eric Nylander, Westminster, CO (US); George David, Westminster, CO (US)

(73) Assignee: Polycom, Inc., San Jose, CA (US)

( * ) Notice: Subject to any disclaimer, the term of this patent is extended or adjusted under 35 U.S.C. 154(b) by 274 days.

(21) Appl. No.: 15/939,019

(22) Filed: Mar. 28, 2018

(65) Prior Publication Data

US 2018/0288103 A1 Oct. 4, 2018

Related U.S. Application Data

(60) Provisional application No. 62/479,009, filed on Mar. 30, 2017.

(51) Int. Cl.

| | |
|---|---|
| ***H04L 29/06*** | (2006.01) |
| ***H04L 29/08*** | (2006.01) |
| *H04L 12/803* | (2013.01) |

(52) U.S. Cl.

CPC .......... *H04L 65/1006* (2013.01); *H04L 63/10* (2013.01); *H04L 65/1069* (2013.01); *H04L 67/1002* (2013.01); *H04L 67/2814* (2013.01); *H04L 47/125* (2013.01); *H04L 63/0807* (2013.01)

(58) Field of Classification Search

None

See application file for complete search history.

(56) References Cited

U.S. PATENT DOCUMENTS 7,653,689 B1 * 1/2010 Champagne ....... H04N 21/2402 709/203
9,424,429 B1 * 8/2016 Roth ....................... G06F 21/45
2003/0131069 A1 * 7/2003 Lucovsky ............. G06F 21/335 709/217
2008/0159299 A1 * 7/2008 Bu .......................... H04L 63/10 370/400
2008/0225720 A1 * 9/2008 Khemani .......... H04L 29/12594 370/235

(Continued)

OTHER PUBLICATIONS

Thatmann, Dirk. Distributed Authorization in Complex Multi Entity-Driven API Ecosystems. 2014 8th International Conference on Signal Processing and Communication Systems (ICSPCS). https://ieeexplore.ieee.org/stamp/stamp.jsp?tp=&arnumber=7021072 (Year: 2014).*

(Continued)

*Primary Examiner* — Jeremiah L Avery
(74) *Attorney, Agent, or Firm* — Blank Rome, LLP

(57) ABSTRACT

SIP INVITE messages received at a load balancer are returned as SIP Redirect messages which are addressed to an access director and include additional information, such as a tracing token and a cryptographic token. When the access director receives the redirected SIP INVITE, the access director analyzes the included cryptographic token and passes the SIP INVITE if the cryptographic token is correct. This provides the needed access control function to allow the access directors to be directly accessed by the endpoints, rather than funneling all communications through the load balancer.

21 Claims, 5 Drawing Sheets

(56) References Cited

U.S. PATENT DOCUMENTS

| | | | | |
|---|---|---|---|---|
| 2015/0271331 A1* | 9/2015 | Segre | H04M 3/5232 379/265.09 |
| 2015/0319035 A1* | 11/2015 | Zourzouvillys | H04L 65/1006 370/228 |
| 2016/0234196 A1* | 8/2016 | Fausak | H04L 12/4679 |
| 2017/0006113 A1* | 1/2017 | Singhal | H04L 67/141 |
| 2017/0118275 A1* | 4/2017 | Singh | H04L 67/1002 |
| 2018/0109632 A1* | 4/2018 | Stammers | H04L 65/1066 |

OTHER PUBLICATIONS

Rieger, Sebastian. Using Federated Identities to access IP-protected Web Resources in Multi-Customer Environments. 2010 Fifth International Conference on Internet and Web Applications and Services. https://ieeexplore.ieee.org/stamp/stamp.jsp?tp=& arnumber=5476496 (Year: 2010).*

Babanne, Vanita; Navale, Girish. Load Balancer Plug in Filter:—Identification and Prevention of Web Attacks. 2014 International Conference on Control, Instrumentation, Communication and Computational Technologies (ICCICCT). https://ieeexplore.ieee.org/stamp/stamp.jsp?tp=&arnumber=6993072 (Year: 2014).*

* cited by examiner 100A
tom@sanjose.polycom.com
Media flow
Signaling flow
100B
dick@sidshardware.com
100C
jane@vancouver.polycom.com
100D
sally@sanjose.polycom.com
100E
harry@sidshardware.com
client.polycom.com
client.sidshardware.com
102
110B
1.1.1.1
110A
1.1.1.2
Access
Director
120D
1.1.2.1
120C
1.1.2.2
120B
1.1.2.3
120A
1.1.2.4
Distributed
Media
Application
130J
1.1.3.1
130I
1.1.3.2
130H
1.1.3.3
130G
1.1.3.4
130F
1.1.3.5
130E
1.1.3.6
130D
1.1.3.7
130C
1.1.3.8
130B
1.1.3.9
130A
1.1.3.10
Collaboration
Server (MCU)

INTERNET CONNECTION LOAD BALANCING WITH DIRECT ACCESS TO BALANCED DEVICES

CROSS-REFERENCE TO RELATED APPLICATIONS

This application claims priority to U.S. Provisional Application No. 62/479,009, filed Mar. 30, 2017, the contents of which are entirely incorporated by reference herein.

BACKGROUND

Being able to access devices and functions over the Internet has greatly improved modern communications and data access. Because of the improvements, such access has become extremely popular. The extreme popularity also brings along the need to have very large-scale operations, often referred to Internet-scale. A factor complicating the large-scale operations is that access to the service or function is often through a single uniform resource identifier (URI) or Internet Protocol (IP) address. An additional factor complicating the large-scale operations is the need to keep the devices providing the services or functions protected from improper access. A gateway or firewall provides the security capability while a load balancer provides the distribution to the many devices that actually provide the services and functions. A problem arises because the gateways and the devices are generally configured to operate on a local or private IP address space, whereas the external address of the load balancer is a public IP address. Therefore, a mapping or network address translation (NAT) must occur and this mapping needs to be stateful and needs to maintain persistent connections as well. The load balancer can perform the mapping function, but the stateful nature, combined with the extremely large numbers of connections in a large-scale operation, means that the load balancer is a heavily loaded device and thus becomes very expensive.

It is desirable to be able to provide Internet-scale operations without requiring a very expensive and complicated, public-facing load balancer or equivalent but also to maintain security of the internal devices providing the services and functions.

SUMMARY

In embodiments according to the present invention, SIP INVITE messages received at a load balancer are returned as SIP Redirect messages which are addressed to an access director and include additional information, such as a tracing token and a cryptographic token. When the access director receives the redirected SIP INVITE, the access director analyzes the included cryptographic token and passes the SIP INVITE if the cryptographic token is correct. This provides the needed access control function to allow the access directors to be directly accessed by the endpoints, rather than funneling all communications through the load balancer.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
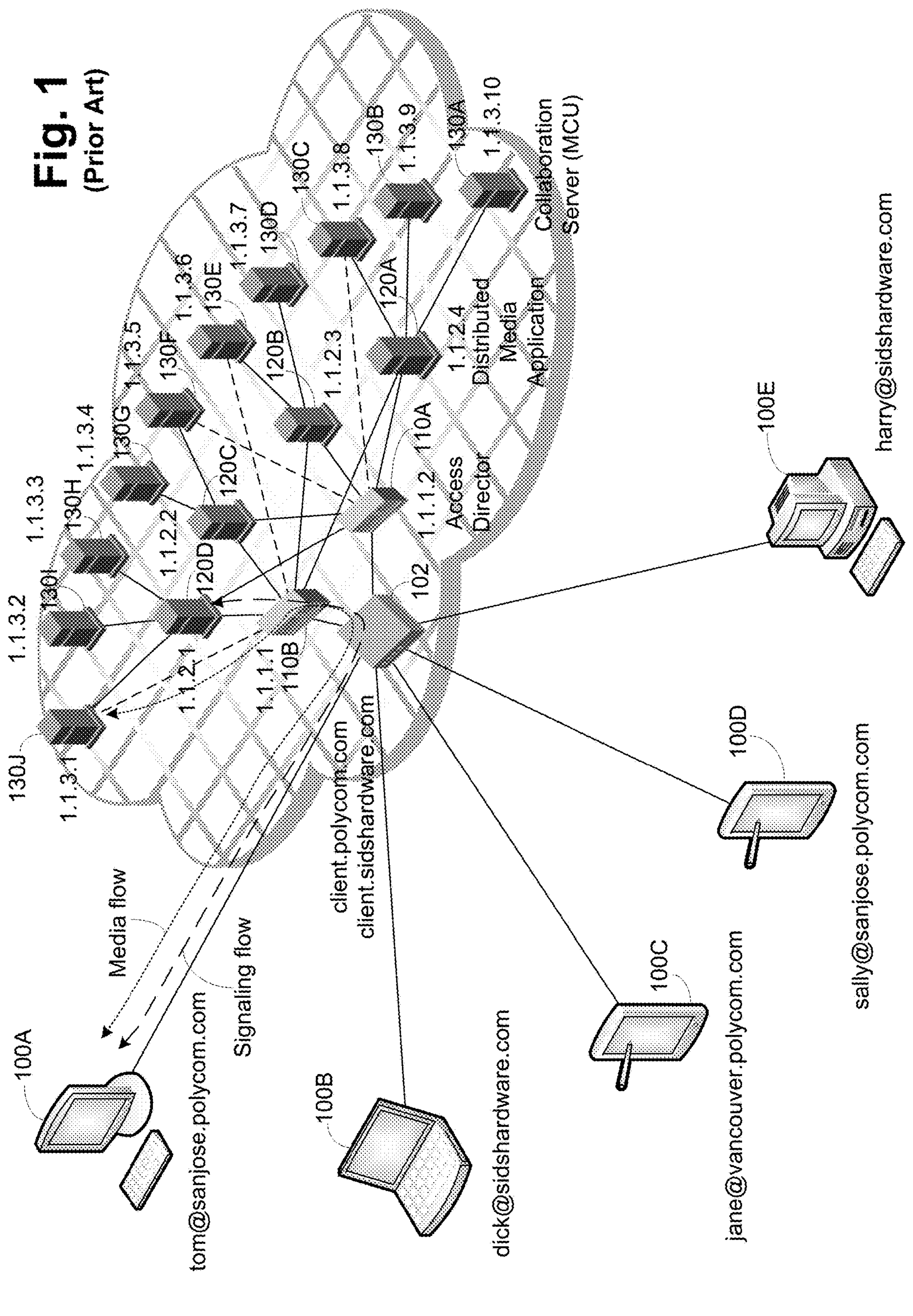
FIG. 1 is a block diagram illustrating connections and flows of an Internet connection load balancing arrangement according to the prior art.

FIG. 1 is an example of operation according to the prior art. The example is based on Session Initiation Protocol (SIP) communications, but the flow for H.323 communications and normal Internet services and functions flow are similar.

A series of SIP endpoints 100A-100E, in the illustrated case some having polycom.com addresses and others having sidshardware.com, are present, it being understood that in practice a variety of domains are used as the system is designed to handle multiple companies at one time. To make a call, the SIP endpoints 100A-100E access a load balancer 102 that has public IP addresses of client.polycom.com and client.sidshardware.com. The load balancer 102 then performs the needed address mapping and forwards the call request, an INVITE, to an access director 110A, 110B, a device which operates as a firewall or gateway to provide security. There are a number of access directors 110A, 100B to handle a large volume of calls. In the example, the access directors 110A, 110B have internal IP addresses of 1.1.1.x. It is understood that the illustrated addressing is for explanation purposes only and different addresses and addressing schemes would be used in practice. A load balancing function is then performed by the access director 100A, 100B or a centralized management facility, to select one of a series of distributed media application instances 120A-D which handle the signaling for the call and select a particular collaboration server or multipoint control unit (MCU) 130A-J that performs the desired conferencing function of the illustration. The distributed media application instances 120A-D are illustrated as having IP addresses of 1.1.2.x, while the collaboration servers 130A-J use IP addresses of 1.1.3.x. Not shown for simplicity are most of the connections from the access directors 100A-D to the collaboration servers 130A-J, only an illustrative few being shown to avoid overly cluttering the figure. It is understood that the connections are logical, as the physical architecture is that of a normal local area network (LAN).

When an INVITE is received from an endpoint 100A-E by the load balancer 102, a particular access director 100A, 100B is selected and the INVITE is forwarded to that access director 110A, 110B. The access director 110A, 110B, in turn, forwards the INVITE to a selected distributed media application instance 120A-D. The distributed media application instance 120A-D replies to the endpoint 100A-E. Signaling continues between the endpoint 100A-E and the selected distributed media application instance 120A-D, through the access director 110A, 110B and load balancer 102, until the call is established. When the call is established, the real-time media flow is through the load balancer 102 and the access director 110A, 110B to the selected collaboration server 130A-J, the distributed media application instance 120A-D no longer involved until call termination. These signaling and media flows are illustrated in FIG. 1.

In an example, a second INVITE to a different conference is received from a different endpoint 100A-E. That INVITE passes through the load balancer 102, then to a different access director 110A, 100B (due to load balancing), to a different distributed media application instance 120A-D (again, load balancing). The connection is established between the second endpoint 100A-E and a different collaboration server 130A-J (load balancing once again). The signaling and media flows are still going through the load balancer 102, so now two calls are being passed through the load balancer 102. Expand this to thousands or tens of thousands of calls, which though spread over various access directors 110A, 100B, distributed media application instances 120A-D and collaboration servers 130A-J still would all go through the load balancer 102 and the problem discussed above becomes apparent.

Figure 2:
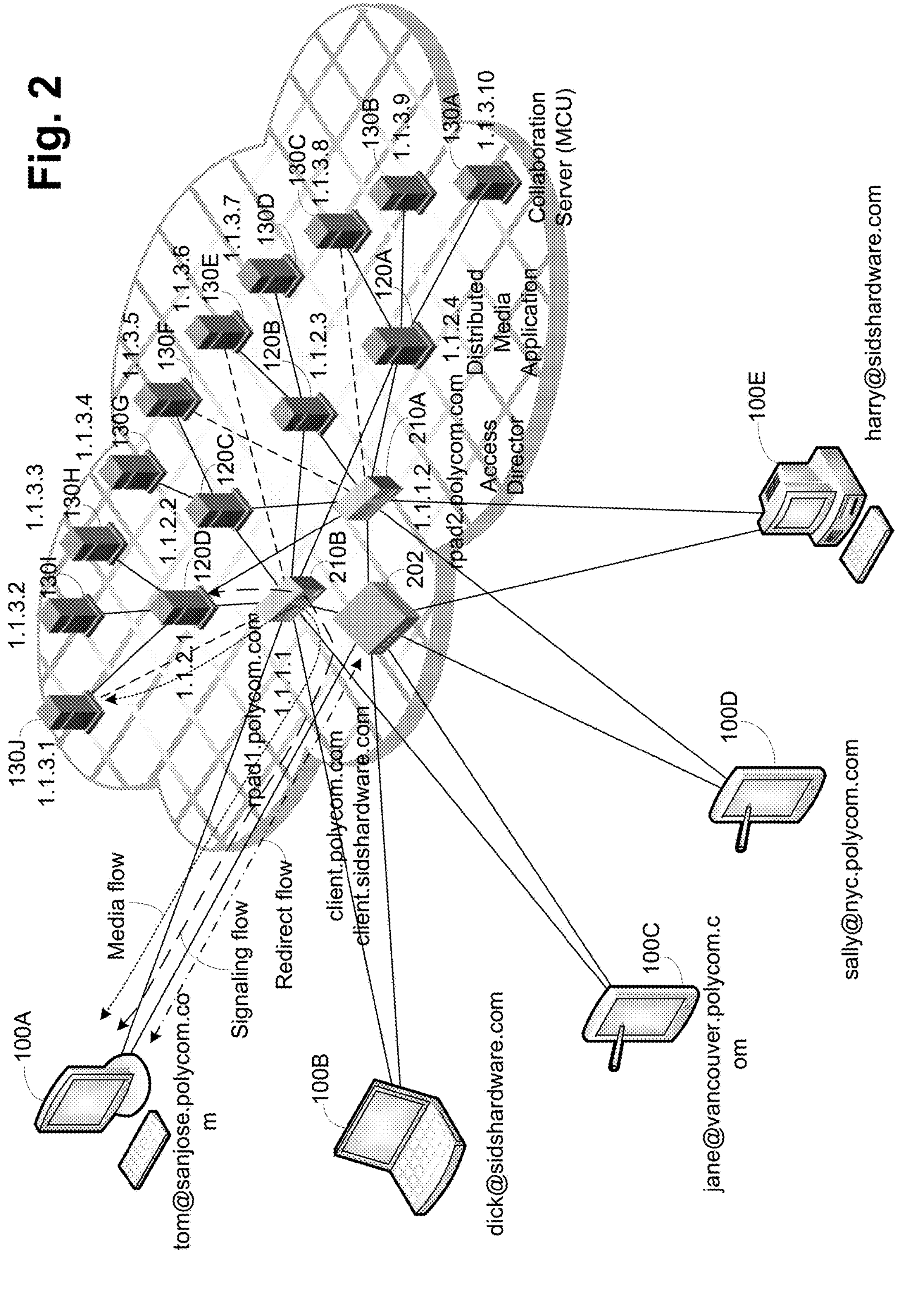
FIG. 2 is a first block diagram illustrating connections and flows of an Internet connection load balancing arrangement according to the present invention.

In operations according to the present invention, referring to FIG. 2, only the initial INVITE message goes through an enhanced load balancer (or its replacement) 202, with the call signaling and media flows going directly to the selected access director 210A, 210B. In short, this happens by each of the access directors 210A, 210B having a public IP address, such as rpad1.polycom.com or rpad2.polycom.com, and the enhanced load balancer 202 providing that public IP address in a SIP Redirect response. Secure access is maintained by providing additional information, including a tracing token and a cryptographic token, in the SIP Redirect response and then having an authorization function check the redirected INVITE message for the additional information. If not present, the call is simply refused. This greatly simplifies the operation of the enhanced load balancer 202, as now it only needs to perform the normal load balancing determination, determine the additional information and provide the SIP Redirect response to the endpoint 100A-E. No further signaling and no media flows pass through the enhanced load balancer 202, and yet access to the functions is secure.

When the case of a second INVITE to a different conference from a different endpoint 100A-E is considered now, only the initial INVITE goes to the enhanced load balancer 202, with the remainder of the signaling flow and the media flow bypassing the enhanced load balancer 202 and going directly to the access director 210A, 210B.

This is shown in FIG. 2, where a redirect flow has been added. The redirect flow is between the endpoint 100A and the enhanced load balancer 202 at client.polycom.com. The signaling flow is then directed to the access director 210B and the selected distributed media application instance 120A-D. Media flow is directed to the access director 210B and the selected collaboration server 130A-J.

Figure 3:
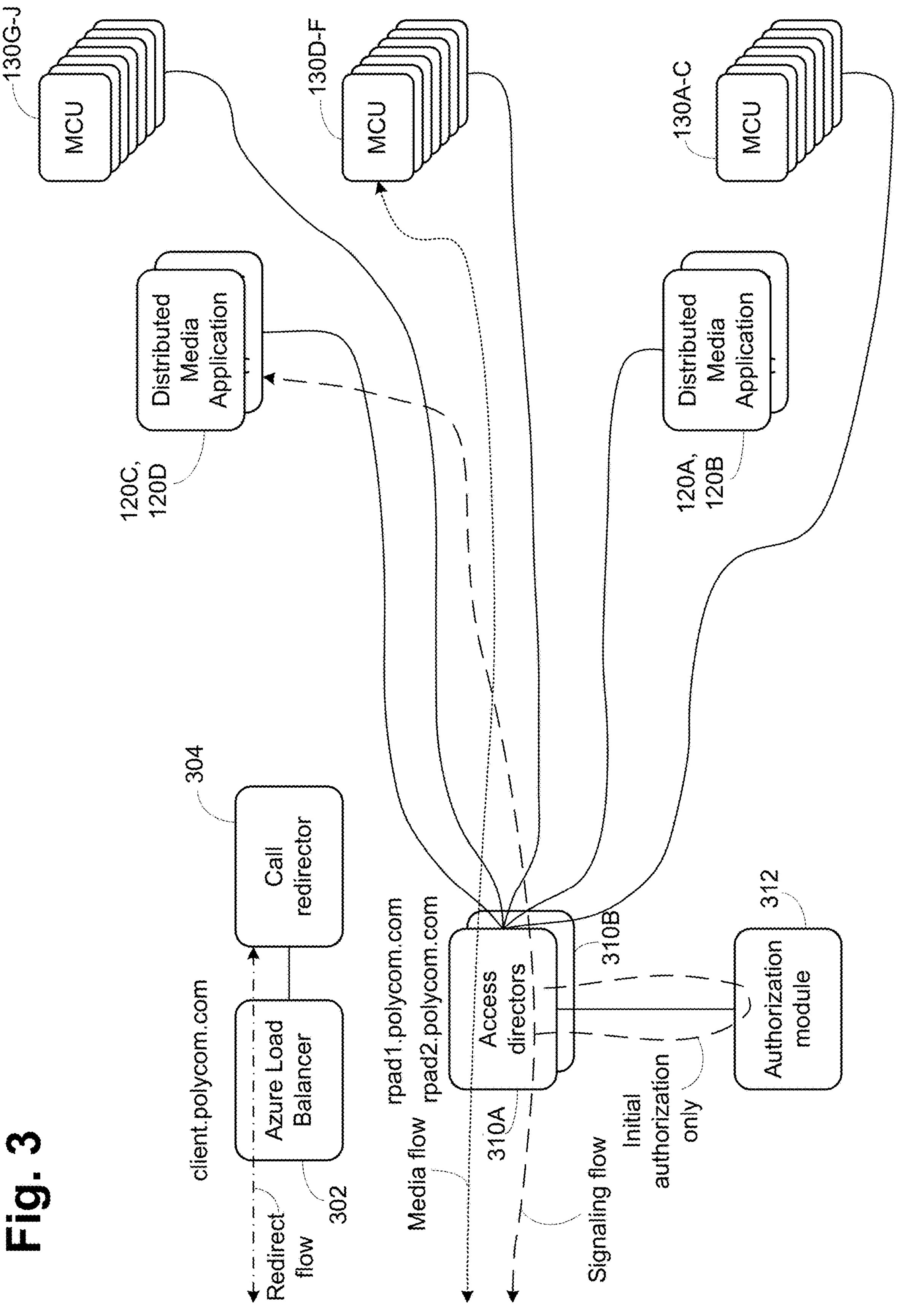
FIG. 3 is a second block diagram illustrating connections and flows of an Internet connection load balancing arrangement according to the present invention.

FIG. 3 is an alternate embodiment to FIG. 2. In the FIG. 3 embodiment, all of the devices may be virtual devices contained in a cloud environment, such as Microsoft® Azure®. In some cases, physical MCUs can be utilized in a mixed environment to provide greater call handling capabilities, but otherwise virtual MCUs are suitable. In this embodiment, client.polycom.com is directed to a conventional Azure load balancer 302, which provides geographic data center selection, for the common reasons that is performed, such as shorter transmission times and redundancy. The initial INVITE is provided to a Call Redirector 304, which performs the SIP Redirection discussed above, including the selection of the access director 310A, 310B and the development of the SIP contact string including the tracing token and the cryptographic token. The Azure load balancer 302 and the Call Redirector 304 are thus performing the operations of the enhanced load balancer 202 of FIG. 2. The SIP Redirection is provided to the endpoint 100A-100E. The redirected INVITE is sent to the access director 310A, 310B. If only initial authorization is being performed, the redirected INVITE is forwarded to an authorization module appliance 312, which performs the authorization function. The authorization module appliance 312 determines if the request is authorized, as discussed above. If so, the cryptographic token is preferably removed and a redirect response is provided to the access director 310A, 310B, directing the INVITE request to the appropriate distributed media application instance 120A-D. Therefore the authorization mode appliance 312 has also performed the load balancing of the distributed media application instances. The access director 310A, 310B performs needed mapping and sends the internally redirected INVITE request to the indicated distributed media application instance 120A-D. If no further authorization is needed, then the signaling flow proceeds between the distributed media application instance 120A-D and the endpoint 100A-E directly through the access director 310A, 310B without a loop to the authorization module appliance 312. If full authorization of all signaling from the endpoint 100A-E is desired, then all signaling flows through the authorization module appliance 312, using redirects as discussed above. Media flow is also directly between the selected collaboration server or MCU instance 130A-J and the endpoint 100A-E through the access director 310A, 310B.

Figure 4:
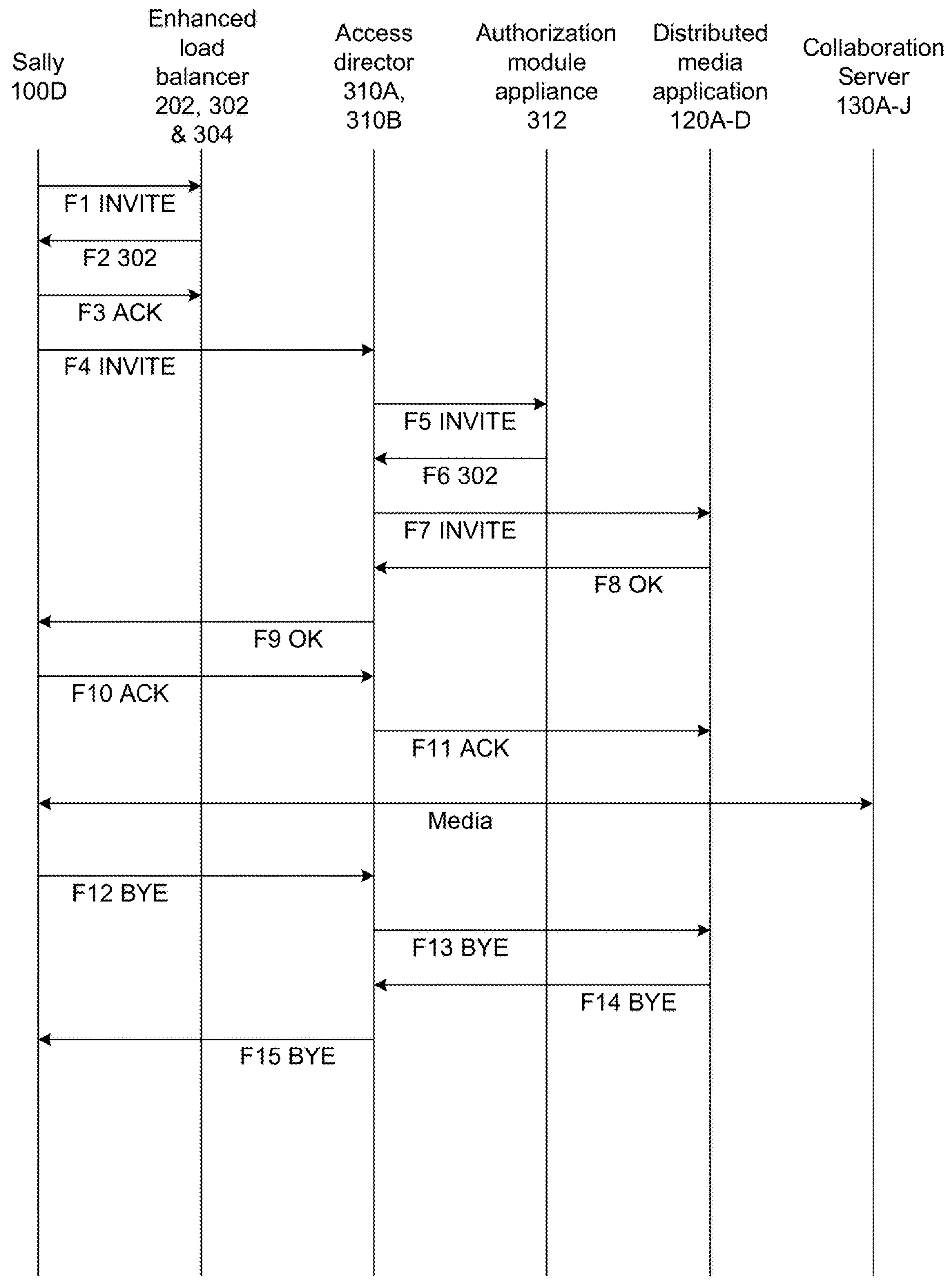
FIG. 4 is an example of SIP signaling according to the present invention.

Exemplary SIP signaling is provided here in Table 1 with reference to FIGS. 3 and 4 for further explanation.

TABLE 1

| F1 Sally → Enhanced load balancer (call to conference 019982835 with tenant 222222) |
|---|
| INVITE sip:222222.019982835@client.sidshardware.com SIP/2.0<br>Via: SIP/2.0/TCP<br>192.168.1.19:5060;branch=z9hG4bK2753383482-1019;received=111.222.33.44;<br>rport=38943<br>Max-Forwards: 70<br>Allow:<br>INVITE,BYE,CANCEL,ACK,INFO,PRACK,COMET,OPTIONS,SUBSCRIBE,NOTIFY,MESSAGE,<br>REFER,REGISTER,UPDATE<br>From: "SIP_Sally"<br><sip:SIP_Sally@192.168.1.19>;tag=plcm_2753383742-1019;epid=8213190F7843<br>CW<br>To: <sip:222222.019982835@client.sidshardware.com> |

TABLE 1-continued

Call-ID: 2753365910-1019
CSeq: 1 INVITE
Session-Expires: 1800
Supported: replaces,ms-dialog-route-set-update,ms-forking,timer
Contact: “SIP__Sally”
<sip:SIP__Sally@192.168.1.19:5060;transport=tcp>;proxy=replace;+sip.instance=
“<urn:uuid:77939007-d15e-5a7e-80bd-7c884c707189>”
User-Agent: PolycomRealPresenceGroup700/6.1.0
MRD: MRE; MRC-V=1.0.1
P__Preferred__Identity: SIP__Sally
Content-Type: application/sdp
Content-Length: 1533
<.......SDP......>

F2 Enhanced load balancer → Sally

SIP/2.0 302 Moved Temporarily
CSeq: 1 INVITE
Call-ID: 2753365910-1019
From: “SIP__Sally”
<sip:SIP__Sally@192.168.1.19>;tag=plcm__2753383742-1019;epid=8213190F7843
CW
To: <sip:222222.019982835@client.sidshardware.com>;tag=7dfc0552
Via: SIP/2.0/TCP
192.168.1.19:5060;branch=z9hG4bK2753383482-1019;received=111.222.33.44;
rport=38943
Contact:
<sip:222222.019982835-8d4b5408c095d29e-dc3b6d296e10f123@201.64.127.58:5060;
transport=tcp>;expires=15
Expires: 15
Content-Length: 0

F3 Sally → Enhanced load balancer

ACK sip:222222.019982835@client.sidshardware.com SIP/2.0
Via: SIP/2.0/TCP
192.168.1.19:5060;branch=z9hG4bK2753383482-1019;received=111.222.33.44;
rport=38943
Max-Forwards: 70
From: “SIP__Sally”
<sip:SIP__Sally@192.168.1.19>;tag=plcm__2753383742-1019;epid=8213190F7843
CW
To: <sip:222222.019982835@client.sidshardware.com>;tag=7dfc0552
Call-ID: 2753365910-1019
CSeq: 1 ACK
Contact: “SIP__Sally”
<sip:SIP__Sally@192.168.1.19:5060;transport=tcp>;proxy=replace;+sip.instance=
“<urn:uuid:77939007-d15e-5a7e-80bd-7c884c707189>”
User-Agent: PolycomRealPresenceGroup700/6.1.0
MRD: MRE; MRC-V=1.0.1
P__Preferred__Identity: SIP__Sally
Allow:
ACK,BYE,CANCEL,INVITE,NOTIFY,OPTIONS,REFER,REGISTER,UPDATE,SUBSCRIBE,INFO,
PRACK,COMET,MESSAGE
Supported: timer,replaces,ms-dialog-route-set-update,ms-forking
Content-Length: 0

F4 Sally → Access director

INVITE
sip:222222.019982835-8d4b5408c095d29e-dc3b6d296e10f123@201.64.127.58
SIP/2.0
Via: SIP/2.0/TCP
192.168.1.19:5060;branch=z9hG4bK2753603679-1019;received=111.222.33.44
Max-Forwards: 70
Allow:
INVITE,BYE,CANCEL,ACK,INFO,PRACK,COMET,OPTIONS,SUBSCRIBE,NOTIFY,MESSAGE,
REFER,REGISTER,UPDATE
From: “SIP__Sally”
<sip:SIP__Sally@192.168.1.19>;tag=plcm__2753603734-1019;epid=8213190F7843
CW
To: <sip:222222.019982835-8d4b5408c095d29e-dc3b6d296e10f123@201.64.127.58>
Call-ID: 2753603370-1019
CSeq: 1 INVITE
Session-Expires: 1800
Supported: replaces,ms-dialog-route-set-update,ms-forking,timer
Contact: “SIP__Sally”
<sip:SIP__Sally@192.168.1.19:5060;transport=tcp>;proxy=replace;+sip.instance=
“<urn:uuid:77939007-d15e-5a7e-80bd-7c884c707189>”
User-Agent: PolycomRealPresenceGroup700/6.1.0

TABLE 1-continued

MRD: MRE; MRC-V=1.0.1
P__Preferred__Identity: SIP__Sally
Content-Type: application/sdp
Content-Length: 1534
<.......SDP......>

F5 Access director → Authorization function appliance

INVITE
sip:222222.019982835-8d4b5408c095d29e-dc3b6d296e10f123@201.64.127.58
SIP/2.0
Allow:
INVITE,BYE,CANCEL,ACK,INFO,PRACK,COMET,OPTIONS,SUBSCRIBE,NOTIFY,MESSAGE,
REFER,REGISTER,UPDATE
From: “SIP__Sally”
<sip:SIP__Sally@192.168.1.19>;tag=plcm__2753603734-1019;epid=8213190F7843
CW
To: <sip:222222.019982835-8d4b5408c095d29e-dc3b6d296e10f123@201.64.127.58>
Call-ID: cdf4a6d4e1fc34cf6d039a0220e95f96@12.255.12.5
CSeq: 1 INVITE
Supported: replaces,ms-dialog-route-set-update,ms-forking,timer
User-Agent: PolycomRealPresenceGroup700/6.1.0
MRD: MRE; MRC-V=1.0.1
P__Preferred__Identity: SIP__Sally
Content-Type: application/sdp
Via: SIP/2.0/TCP
12.255.12.5:5070;branch=z9hG4bK-3339-ba61f261ad596e86df9294a0593c7a24
Contact: “outbound” <sip:12.255.12.5:5070;transport=tcp>
Max-Forwards: 69
Session-Expires: 1800;refresher=uac
Content-Length: 1532
<.......SDP......>

F6 Authorization function appliance → Access director

SIP/2.0 302 Moved Temporarily
CSeq: 1 INVITE
Call-ID: cdf4a6d4e1fc34cf6d039a0220e95f96@12.255.12.5
From: “SIP__Sally”
<sip:SIP__Sally@192.168.1.19>;tag=plcm__2753603734-1019;epid=8213190F7843
CW
To:
<sip:222222.019982835-8d4b5408c095d29e-dc3b6d296e10f123@201.64.127.58>;
tag=5e95e573
Via: SIP/2.0/TCP
12.255.12.5:5070;branch=z9hG4bK-3339-ba61f261ad596e86df9294a0593c7a24;rport=
13592
Contact:
<sip:222222.019982835@12.201.12.5:5050;plcmTrace=8d4b5408c095d29e;transport=
tcp>;expires=15
Expires: 15
Content-Length: 0

F7 Access director → Distributed media application

INVITE
sip:222222.019982835@12.201.12.5:5050;plcmTrace=8d4b5408c095d29e;transport=
tcp SIP/2.0
Allow:
INVITE,BYE,CANCEL,ACK,INFO,PRACK,COMET,OPTIONS,SUBSCRIBE,NOTIFY,MESSAGE,
REFER,REGISTER,UPDATE
From: “SIP__Sally”
<sip:SIP__Sally@192.168.1.19>;tag=plcm__2753603734-1019;epid=8213190F7843
CW
To: <sip:222222.019982835-8d4b5408c095d29e-dc3b6d296e10f123@201.64.127.58>
Call-ID: b97af38fa336b17355f911c14bdae099@12.255.12.5
CSeq: 1 INVITE
Supported: replaces,ms-dialog-route-set-update,ms-forking,timer
User-Agent: PolycomRealPresenceGroup700/6.1.0
MRD: MRE; MRC-V=1.0.1
P__Preferred__Identity: SIP__Sally
Content-Type: application/sdp
Via: SIP/2.0/TCP
12.255.12.5:5070;branch=z9hG4bK-3339-e641794408d6298fb79f85f4001b8c88
Contact: “outbound” <sip:12.255.12.5:5070;transport=tcp>
Max-Forwards: 69
Session-Expires: 1800;refresher=uac
Content-Length: 1532
<.......SDP......>

TABLE 1-continued

F8 Distributed media application → Access director

```
SIP/2.0 200 OK
CSeq: 1 INVITE
Call-ID: b97af3Sfa336b17355f911c14bdae099@12.255.12.5
From: "SIP_Sally"
    <sip:SIP_Sally@192.166.1.19>;tag=plcm_2753603734-1019;epid=8213190F7843
    CW
To:
    <sip:222222.019982835-8d4b5408c095d29e-dc3b6d296e10f123@201.64.127.58>;
    tag=64674dbb
Via: SIP/2.0/TCP
    12.255.12.5:5070;branch=z9hG4bK-3339-e641794408d6298fb79f85f4001b8c88;rport=
    13593
Allow-Events: conference,refer
User-Agent: Polycom/Polycom Soft MCU/8.7.4
P-RMX-Info: i,c,4096000,101,a
Allow:
    INVITE,ACK,BYE,CANCEL,INFO,OPTIONS,UPDATE,PRACK,SUBSCRIBE,NOTIFY,BENOTIFY
Require: timer
Supported:
    tdialog,timer,100rel,ms-conf-invite,ms-early-media,plcm-ivr-service-provider,
    replaces,resource-priority,histinfo,ms-safe-transfer,ms-sender
Contact: "inbound"
    <sip:directlync-222222-019982835-cpc-8d4b5408c095d29e@12.201.12.5:5050;
    transport=tcp>;proxy=replace;isfocus
Content-Type: application/sdp
Session-Expires: 1800;refresher=uac
Content-Length: 802
<.......SDP......>
```

F9 Access director → Sally

```
SIP/2.0 200 OK
To:
    <sip:222222.019982835-8d4b5408c095d29e-dc3b6d296e10f123@201.64.127.58>;
    tag=64674dbb
Via: SIP/2.0/TCP
    192.168.1.19:5060;branch=z9hG4bK2753603679-1019;received=111.222.33.44;
    rport=37533
CSeq: 1 INVITE
Call-ID: 2753603370-1019
From: "SIP_Sally"
    <sip:SIP_Sally@192.168.1.19>;tag=plcm_2753603734-1019;epid=8213190F7843
    CW
Content-Type: application/sdp
Allow-Events: conference, refer
User-Agent: Polycom/Polycom Soft MCU/8.7.4
P-RMX-Info: i,c,4096000,101,a
Allow:
    INVITE,ACK,BYE,CANCEL,INFO,OPTIONS,UPDATE,PRACK,SUBSCRIBE,NOTIFY,BENOTIFY
Require: timer
Supported:
    tdialog,timer,100rel,ms-conf-invite,ms-early-media,plcm-ivr-service-provider,
    replaces,resource-priority,histinfo,ms-safe-transfer,ms-sender
Contact: "inbound-external"
    <sip:222222.019982835-8d4b5408c095d29e-dc3b6d296e10f123@201.64.127.58:5060;
    transport=tcp>;isfocus
Session-Expires: 1800;refresher=uac
Content-Length: 803
<.......SDP......>
```

F10 Sally → Access director

```
ACK
    sip:222222.019982835-8d4b5408c095d29e-dc3b6d296e10f123@201.64.127.58:5060;
    transport=tcp SIP/2.0
Via: SIP/2.0/TCP
    192.168.1.19:5060;branch=z9hG4bK2754883780-1019;received=111.222.33.44
Max-Forwards: 70
From: "SIP_Sally"
    <sip:SIP_Sally@192.168.1.19>;tag=plcm_2753603734-1019;epid=8213190F7843
    CW
To:
    <sip:222222.019982835-8d4b5408c095d29e-dc3b6d296e10f123@201.64.127.58>;
    tag=64674dbb
Call-ID: 2753603370-1019
CSeq: 1 ACK
Contact: "SIP_Sally"
    <sip:SIP_Sally@192.168.1.19:5060;transport=tcp>;proxy=replace;+sip.instance=
```

TABLE 1-continued

"<urn:uuid:77939007-d15e-5a7e-80bd-7c884c707189>"
User-Agent: PolycomRealPresenceGroup700/6.1.0
MRD: MRE; MRC-V=1.0.1
P_Preferred_Identity: SIP_Sally
Allow:
ACK,BYE,CANCEL,INVITE,NOTIFY,OPTIONS,REFER,REGISTER,UPDATE,SUBSCRIBE,INFO,
PRACK,COMET,MESSAGE
Supported: timer,replaces,ms-dialog-route-set-update,ms-forking
Content-Length: 0

F11 Access director → Distributed media application

ACK
sip:directlync-222222-019982835-cpc-8d4b5408c095d29e@12.201.12.5:5050;transport=
tcp SIP/2.0
Call-ID: b97af38fa336b17355f911c14bdae099@12.255.12.5
CSeq: 1 ACK
Via: SIP/2.0/TCP
12.255.12.5:5070;branch=z9hG4bK-3339-c5b0b14f1b8209d7c91e777aac89928b
From: "SIP_Sally" <sip:SIP_Sally@192.168.1.19>;tag=plcm_2753603734-1019
To:
<sip:222222.019982835-8d4b5408c095d29e-dc3b6d296e10f123@201.64.127.58>;
tag=64674dbb
User-Agent: PolycomRealPresenceGroup700/6.1.0
MRD: MRE; MRC-V=1.0.1
P_Preferred_Identity: SIP_Sally
Allow:
ACK,BYE,CANCEL,INVITE,NOTIFY,OPTIONS,REFER,REGISTER,UPDATE,SUBSCRIBE,INFO,
PRACK,COMET,MESSAGE
Supported: timer,replaces,ms-dialog-route-set-update,ms-forking
Contact: "outbound" <sip:12.255.12.5:5070;transport=tcp>
Max-Forwards: 69
Content-Length: 0
/* RTP streams are established between Sally and Collaboration server */

F12 Sally → Access Director

BYE
sip:222222.019982835-8d4b5408c095d29e-dc3b6d296e10f123@201.64.127.58:5060;
transport=tcp SIP/2.0
Via: SIP/2.0/TCP
192.168.1.19:5060;branch=z9hG4bK2754883780-1019;received=111.222.33.44
Max-Forwards: 70
From: "SIP_Sally"
<sip:SIP_Sally@192.168.1.19>;tag=plcm_2753603734-1019;epid=8213190F7843
CW
To:
<sip:222222.019982835-8d4b5408c095d29e-dc3b6d296e10f123@201.64.127.58>;
tag=64674dbb
Call-ID: 2753603370-1019
CSeq: 1 BYE
Contact: "SIP_Sally"
<sip:SIP_Sally@192.168.1.19:5060;transport=tcp>;proxy=replace;+sip.instance=
"<urn:uuid:77939007-d15e-5a7e-80bd-7c884c707189>"
User-Agent: PolycomRealPresenceGroup700/6.1.0
MRD: MRE; MRC-V=1.0.1
P_Preferred_Identity: SIP_Sally
Allow:
ACK,BYE,CANCEL,INVITE,NOTIFY,OPTIONS,REFER,REGISTER,UPDATE,SUBSCRIBE,INFO,
PRACK,COMET,MESSAGE
Supported: timer,replaces,ms-dialog-route-set-update,ms-forking
Content-Length: 0

F13 Access Director → Distributed media application

BYE
sip:directlync-222222-019982835-cpc-8d4b5408c095d29e@12.201.12.5:5050;transport=
tcp SIP/2.0
Call-ID: b97af38fa336b17355f911c14bdae099@12.255.12.5
CSeq: 1 BYE
Via: SIP/2.0/TCP
12.255.12.5:5070;branch=z9hG4bK-3339-c5b0b14f1b8209d7c91e777aac89928b
From: "SIP_Sally" <sip:SIP_Sally@192.168.1.19>;tag=plcm_2753603734-1019
To:
<sip:222222.019982835-8d4b5408c095d29e-dc3b6d296e10f123@201.64.127.58>;
tag=64674dbb
User-Agent: PolycomRealPresenceGroup700/6.1.0
MRD: MRE; MRC-V=1.0.1
P_Preferred_Identity: SIP_Sally TABLE 1-continued Allow:
ACK,BYE,CANCEL,INVITE,NOTIFY,OPTIONS,REFER,REGISTER,UPDATE,SUBSCRIBE,INFO,
PRACK,COMET,MESSAGE
Supported: timer,replaces,ms-dialog-route-set-update,ms-forking
Contact: “outbound” <sip:12.255.12.5:5070;transport=tcp>
Max-Forwards: 69
Content-Length: 0

F14 Distributed media application → Access Director

BYE
sip:222222.019982835-8d4b5408c095d29e-dc3b6d296e10f123@201.64.127.58:5060;
transport=tcp SIP/2.0
Call-ID: b97af38fa336b17355f911c14bdae099@12.255.12.5
CSeq: 1 BYE
From: “SIP__Sally”
<sip:SIP__Sally@192.168.1.19>;tag=plcm__2753603734-1019;epid=8213190F7843
CW
To:
<sip:222222.019982835-8d4b5408c095d29e-dc3b6d296e10f123@201.64.127.58>;
tag=64674dbb
Via: SIP/2.0/TCP
12.255.12.5:5070;branch=z9hG4bK-3339-e641794408d6298fb79f85f4001b8c88;rport=
13593
Allow-Events: conference, refer
User-Agent: Polycom/Polycom Soft MCU/8.7.4
P-RMX-Info: i,c,4096000,101,a
Allow:
INVITE,ACK,BYE,CANCEL,INFO,OPTIONS,UPDATE,PRACK,SUBSCRIBE,NOTIFY,BENOTIFY
Require: timer
Supported:
tdialog,timer,100rel,ms-conf-invite,ms-early-media,plcm-ivr-service-provider,
replaces,resource-priority,histinfo,ms-safe-transfer,ms-sender
Contact: “inbound”
<sip:directlync-222222-019982835-cpc-8d4b5408c095d29e@12.201.12.5:5050;
transport=tcp>;proxy=replace;isfocus
Content-Type: application/sdp
Session-Expires: 1800;refresher=uac
Content-Length: 802
<.......SDP......>

F15 Access Director → Sally

BYE sip:SIP__Sally@192.168.1.19;transport=tcp SIP/2.0
To:
<sip:222222.019982835-8d4b5408c095d29e-dc3b6d296e10f123@201.64.127.58>;
tag=64674dbb
Via: SIP/2.0/TCP
192.168.1.19:5060;branch=z9hG4bK2753603679-1019;received=111.222.33.44;
rport=37533
CSeq: 1 BYE
Call-ID: 2753603370-1019
From: “SIP__Sally”
<sip:SIP__Sally@192.168.1.19>;tag=plcm__2753603734-1019;epid=8213190F7843
CW
Content-Type: application/sdp
Allow-Events: conference, refer
User-Agent: Polycom/Polycom Soft MCU/8.7.4
P-RMX-Info: i,c,4096000,101,a
Allow:
INVITE,ACK,BYE,CANCEL,INFO,OPTIONS,UPDATE,PRACK,SUBSCRIBE,NOTIFY,BENOTIFY
Require: timer
Supported:
tdialog,timer,100rel,ms-conf-invite,ms-early-media,plcm-ivr-service-provider,
replaces,resource-priority,histinfo,ms-safe-transfer,ms-sender
Contact: “inbound-external”
<sip:222222.019982835-8d4b5408c095d29e-dc3b6d296e10f123@201.64.127.58:5060;
transport=tcp>;isfocus
Session-Expires: 1800;refresher=uac
Content-Length: 803
<.......SDP......>

F1 initial INVITE:

This is the initial INVITE request from Sally's endpoint 100D to the enhanced load balancer formed by the Azure Load Balancer 302 and the call redirector 304.

F2 302 redirect response:

This is the redirect response provided by the call redirector 304. Of most relevance is the Contact line in the F2 302 Redirect response:

Contact: <sip:222222.019982835-8d4b5408c095d29e-dc3b6d296e10f123@201.64.127.58:5060;transport=tcp>

201.64.127.58 is the new URI or public IP address to be used for the redirected INVITE. In the example of FIG. 2, this redirects the INVITE to rpad1.polycom.com, the public IP address of the access director 210B. 222222.019982835 is the initial or original number. 8d4b5408c095d29e is a tracing token. The tracing token is used for internal system operation, such as logging and the like. dc3b6d296e10f123 is a cryptographic token. The cryptographic token is formed by hashing certain values, using an appropriate hash algorithm. In the preferred embodiments the values that are hashed are the initial number, the tracing token, a shared secret and a time component (preferably at a to second resolution, though other resolutions can be used if tighter or looser access control is desired). The shared secret is shared between the enhanced load balancer 202, 302 & 304 and the authorization function, such as the authorization module 312. As discussed above, in certain embodiments the cryptographic token is removed after the initial authorization.

F4 Redirected INVITE:

The Redirected INVITE is: INVITE sip: 222222.019982835-8d4b5408c095d29e-dc3b6d296e10f123@201.64.127.58. As can be seen, all of the material provided in the contact parameter is provided in the INVITE. The receiving authorization function uses the initial address and the tracing token in conjunction with its own current time and the shared secret to develop its own cryptographic token. If the developed cryptographic token matches the received cryptographic token, the INVITE has been validated and the call is passed through. Preferably, an additional time component, one time interval before the current time, is also used and the result compared. This covers the case where the cryptographic token was computed close enough to the time component interval boundary for the time component to have incremented by one during the redirection process.

F5 Authorization and F6 Internal Redirect

The authorization function can be done in the access director 210A, 210B itself or can be performed by a separate authorization appliance or machine 312. In the case of the separate authorization module appliance 312, the request is forwarded to the authorization module appliance 312, as shown in F5. The authorization module appliance 312 performs the authorization and either returns a reject or an internal redirect, similar to that done above but only for the selected distributed media application instance 120A-D. This internal redirect is shown in F6, the response from the authorization module appliance 312. As can be seen, the cryptographic token has been removed from the contact and the IP address has been changed to reflect the selected distributed redirect application instance 120A-D. In either case, the INVITE request is forwarded to the distributed media application instance 120A-D has had the cryptographic token removed.

The additional information in the SIP Redirect, the initial number, the tracing token and the cryptographic token, can be required in all signaling from the endpoint 100A-D or only in the initial SIP redirect. Once the initial SIP redirect is completed and the distributed media application instance 120A-D has been selected, the access director 210A, 210B, 310A, 310B has memorized the address mapping from the endpoint 100A-E to the distributed media application instance 120A-D, so the use of the cryptographic token is not mandatory.

F7 Internally redirected:

F7 illustrates the internally redirected INVITE being sent to the selected distributed media application instance 120A-D.

The operations after F7 then bypass the enhanced load balancer 202 or 302 & 304. The F9 OK goes directly from the access director 310A, 310B to the endpoint 100D and the F10 ACK is provided directly to the access director 310A, 301B. The BYE operations of F12 and F15 similarly bypass the enhanced load balancer 202 or 302 & 304.

While the access director 210A, 210B, 310A, 310B is also a stateful device, knowing the mappings between the endpoints 100A-E and the selected distributed media application instances 120A-D and collaboration servers 130A-J and other information, this does not present the problem of the prior art load balancer 102. Because each of the access directors 210A, 210B, 310A, 310B can be directly accessed from the public Internet according to the present invention, and yet the connections remain secure through the use of the cryptographic token as described above, the access director 210A, 210B, 310A, 310B can be readily replicated, allowing for Internet-scale operations.

Figure 5:
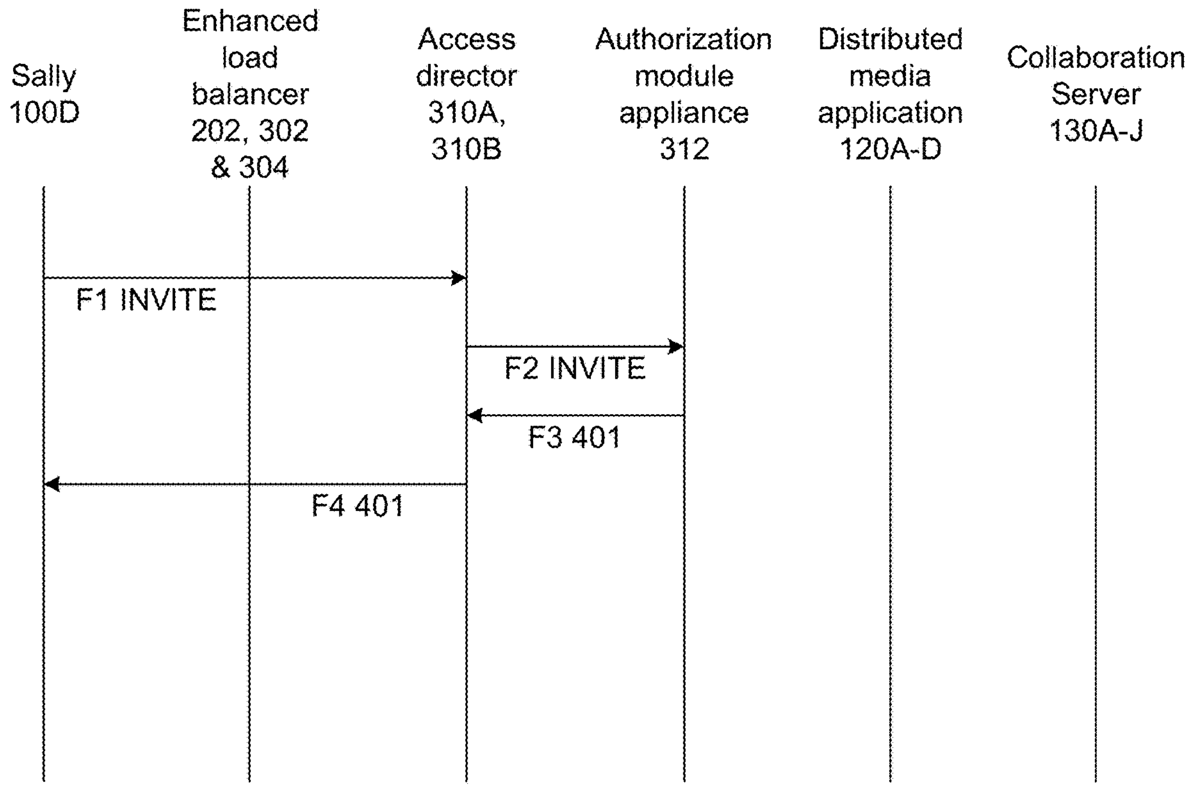
FIG. 5 is an example of SIP signaling according to the present invention

FIG. 5 illustrates the endpoint 100A-100D directly accessing an access director 310A, 310B based on a prior authorized request provided to the access director 310A, 310B, so that the public IP address of the access director 310A, 310B is known, but with the new request not containing valid additional information, such as an outdated cryptographic token. In F1 a SIP INVITE is provided directly from the endpoint 100D to an access director 310A, 310B. This SIP INVITE may not include any additional information or may include outdated additional information, commonly a cryptographic token that has expired. In F2, the SIP INVITE is passed to the authorization module appliance 312. The authorization module appliance 312 evaluates the SIP INVITE for proper additional information. If the additional information is improper, such as by being missing entirely or being outdated, the authorization module appliance 312 returns, in F3, a 401 Unauthorized message. The access director 310A, 310B forwards the 401 Unauthorized message to the endpoint 100D and the call is denied.

Therefore, the operation of redirecting the INVITE request in conjunction with the inclusion of additional information, such as the cryptographic token, allows direct access to the access directors and minimizes the operations of the load balancer that receives the invite INVITE request.

The above description has used SIP messaging as the exemplary format. Hypertext Transfer Protocol (HTTP) messaging is very similar, SIP being developed from HTTP, so very little is changed. For example, GETs are used instead of INVITEs and the Location parameter is used instead of the Contact parameter in a Redirect response. Therefore the described techniques are not limited to communications operations but can be used in any instance where a load balancer is used to control access to Internet-scale servers and the like. H.323 signaling is very different from SIP in the details, but the same general capabilities are provided. Instead of a 301 Moved Permanently or 302 Moved Temporarily response, a FACILITY message is used to provide the redirection in response to a SETUP message or an ACF message is used in response to an ARQ message. In all cases, the same additional information is provided to enable authorization.

Figure 6:
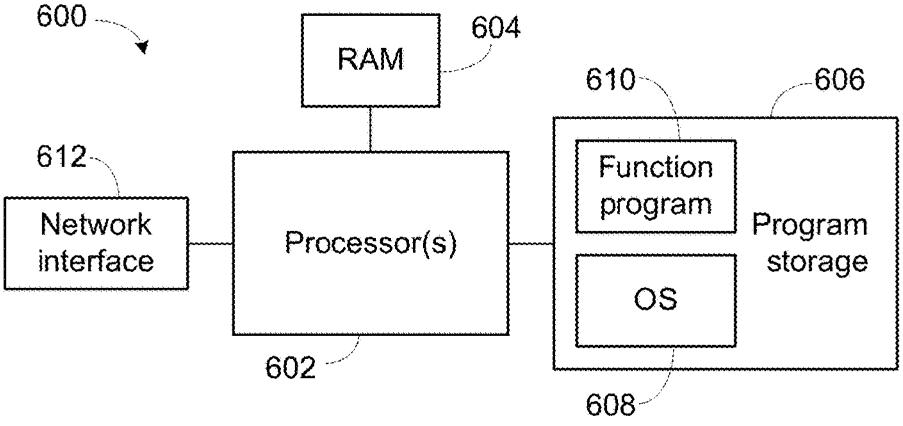
FIG. 6 is a block diagram of a computer for forming a load balancer or access director according to the present invention.

As discussed, the various devices, such as the load balancer, the access directors, the distributed media application instances and the collaboration services are computer systems, either physical or virtual. FIG. 6 provides an exemplary block diagram of a computer 600 usable with each of the load balancer, the access directors, the distributed media application instances and the collaboration services. The computer 600 includes a processor 602, RAM 604, program storage 606 and a network interface 612, with communication occurring through the network interfaces. An operating system (OS) 608 is stored in the program storage 606. Function programs 610 stored in the program storage 606 are executed on the processor 602 to perform the functions described for each device. If a physical MCU is used as a collaboration server, the physical MCU will include digital signal processors and specialized interfaces to allow a higher capacity of operations to be performed.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.”

The invention claimed is:

1. A method of providing a request directly to one of a plurality of replicated access functions controlling access to a load balanced function, the method comprising:

providing an initial request from an endpoint for the load balanced function;

a load balancer providing a redirection response to the endpoint, the redirection response including authorization information and indicating a redirected request should go to a selected one of the plurality of replicated access functions;

the endpoint providing the redirected request to the selected access function, the redirected request including the authorization information;

the selected access function evaluating a received request for proper authorization information to determine if the redirected request is authorized;

the selected access function denying the received request when proper authorization information is not present in the received request; and the selected access function forwarding the received request for further operations when proper authorization information is present in the received request.

2. The method of claim 1, wherein the initial request is a communication request and wherein all communication signaling and media flow occur between the endpoint and the selected access function and not involving the load balancer after the initial request.

3. The method of claim 2, wherein the authorization information is only provided in the redirected request and not in later communication signaling.

4. The method of claim 1, wherein the authorization information includes an initial request address and a cryptographic token, and wherein the cryptographic token is formed from the initial request address, a shared secret and a time value.

5. The method of claim 4, wherein the authorization information further includes a tracing token, and wherein the tracing token is also used in forming the cryptographic token.

6. The method of claim 1, wherein the plurality of replicated access functions have external addresses and the indication is to one of those external addresses.

7. The method of claim 6, wherein the external addresses are public Internet Protocol (IP) addresses.

8. A system for allowing a request from an endpoint directly to one of a plurality of replicated access functions controlling access to a load balanced function, the system comprising:

a load balancer, the load balancer:

receiving an initial request from an endpoint for the load balanced function; and providing a redirection response to the endpoint, the redirection response including authorization information and indicating a request should go to a selected one of the plurality of replicated access functions;

an access function of the plurality of replicated access functions, the access function:

receiving a request for the load balanced function from an endpoint;

evaluating the received request for proper authorization information to determine if the received request is authorized;

denying the received request when proper authorization information is not present in the received request; and forwarding the received request for further operations when proper authorization information is present in the received request.

9. The system of claim 8, wherein the initial request is a communication request and wherein all communication signaling and media flow occur between the endpoint and the selected access function and not involving the load balancer after the initial request.

10. The system of claim 8, wherein the authorization information includes an initial request address and a cryptographic token, and wherein the cryptographic token is formed from the initial request address, a shared secret and a time value.

11. The system of claim 10, wherein the authorization information further includes a tracing token, and wherein the tracing token is also used in forming the cryptographic token.

12. The system of claim 8, wherein the plurality of replicated access functions have external addresses and the indication is to one of those external addresses.

13. The system of claim 12, wherein the external addresses are public Internet Protocol (IP) addresses.

14. A load balancer for allowing a request from an endpoint to proceed directly to one of a plurality of replicated access functions controlling access to a load balanced function, the load balancer comprising:

a processor;

a network interface coupled to the processor; and program storage coupled to the processor, the program storage including a program to cause the processor to:

receive, through the network interface, an initial request from an endpoint for the load balanced function; and provide, through the network interface, a redirection response to the endpoint, the redirection response including authorization information used by an access function to indicate the request should be processed and indicating a request should go to a selected one of the plurality of replicated access functions.

15. The load balancer of claim 14, wherein the authorization information includes an initial request address and a cryptographic token, and wherein the cryptographic token is formed from the initial request address, a shared secret and a time value.

16. The load balancer of claim 15, wherein the authorization information further includes a tracing token, and wherein the tracing token is also used in forming the cryptographic token.

17. The load balancer of claim 14, wherein the plurality of replicated access functions have external addresses and the indication is to one of those external addresses.

18. The load balancer of claim 17, wherein the external addresses are public Internet Protocol (IP) addresses.

19. An access function for allowing a request from an endpoint directly to one of a plurality of replicated access functions controlling access to a load balanced function to be processed, the access function comprising:

a processor;

a network interface coupled to the processor; and program storage coupled to the processor, the program storage including a program to cause the processor to:

receive from an endpoint, through the network interface, a request for the load balanced function, the received request not having passed through a load balancer;

evaluating the received request for proper authorization information to determine if the received request is authorized;

denying the received request when proper authorization information is not present in the received request; and forwarding the received request for further processing operations when proper authorization information is present in the received request.

20. The access function of claim 19, wherein the authorization information includes an initial request address and a cryptographic token, and wherein the cryptographic token is formed from the initial request address, a shared secret and a time value.

21. The access function of claim 20, wherein the authorization information further includes a tracing token, and wherein the tracing token is also used in forming the cryptographic token.

* * * * *